United States Patent [19]
Kessler

[11] Patent Number: 4,860,495
[45] Date of Patent: Aug. 29, 1989

[54] LOW FRICTION PLASTIC WEATHERSTRIP

[76] Inventor: Gerald Kessler, P.O. Box 389, Youngstown, Ohio 44512

[21] Appl. No.: 137,362

[22] Filed: Dec. 23, 1987

[51] Int. Cl.⁴ .................................................. E06B 7/16
[52] U.S. Cl. .................................... 49/498; 49/489
[58] Field of Search ..................... 49/489, 498, 475

[56] References Cited

U.S. PATENT DOCUMENTS

| | | | |
|---|---|---|---|
| 2,228,368 | 1/1941 | Schlegel et al. | 49/479 |
| 2,232,570 | 2/1941 | Spraragen | 49/479 |
| 2,336,835 | 12/1948 | Balfe | 49/479 X |
| 2,475,332 | 7/1949 | Merrill | 49/479 X |
| 3,159,885 | 12/1964 | Cowles | 49/489 X |
| 3,308,727 | 3/1967 | Hurt, Jr. | 49/498 X |
| 3,360,887 | 1/1968 | Parks et al. | 49/498 X |
| 3,378,958 | 4/1968 | Parks et al. | 49/489 |
| 3,385,001 | 5/1968 | Bordner | 49/498 X |
| 3,535,824 | 10/1970 | Kessler | 49/488 |
| 3,685,206 | 8/1972 | Kessler | 49/489 |
| 4,064,654 | 12/1977 | Olson | 49/489 |
| 4,538,380 | 9/1985 | Colliander | 49/475 |

*Primary Examiner*—Philip C. Kannan
*Attorney, Agent, or Firm*—Browdy and Neimark

[57] ABSTRACT

A co-extruded all-polymer weatherstrip has a retainer including a base portion and support portion, an elastic portion extending upwardly from the retainer for providing the desired and needed resiliency, and a generally rigid contact strip supported by and integral with the elastic portion. The rigid contact strip is self-supporting so as to retain its shape and position without becoming creased, wrinkled or bunched-up when subjected to sliding action.

15 Claims, 1 Drawing Sheet

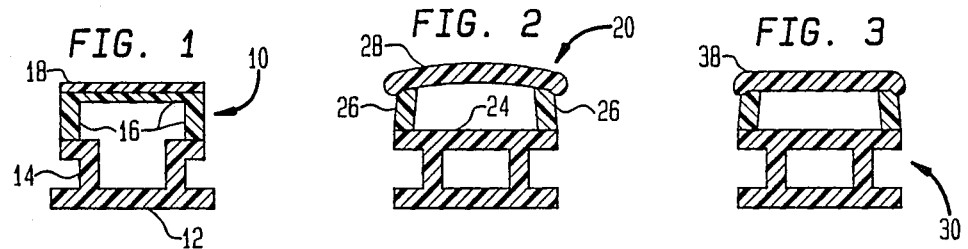
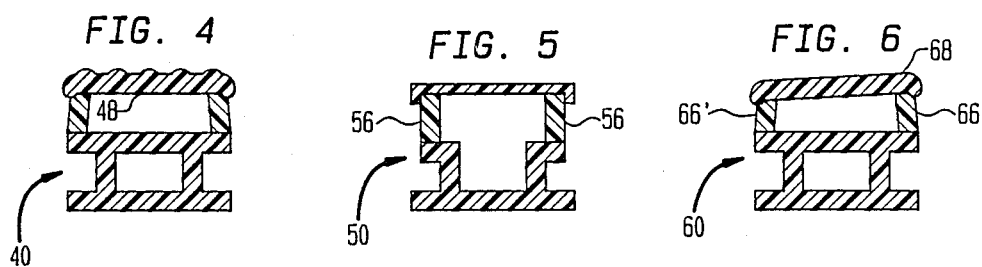
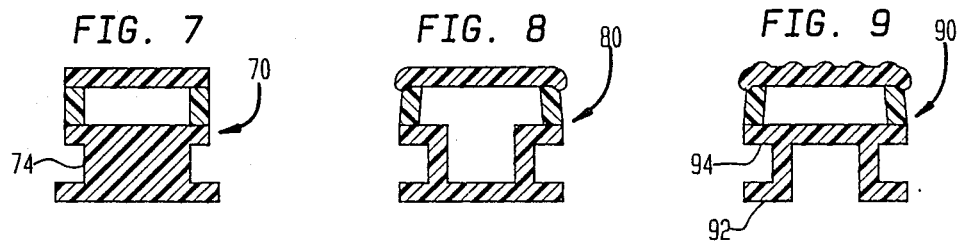
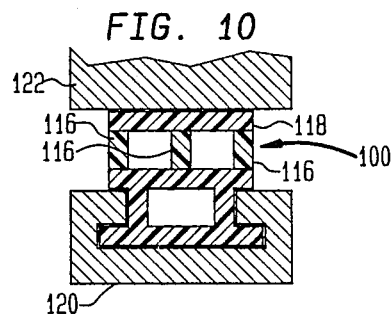

LOW FRICTION PLASTIC WEATHERSTRIP

FIELD OF THE INVENTION

The present invention relates to the sealing of doors, windows and the like; and more particularly, the invention relates to an improved low friction plastic weatherstrip material.

BACKGROUND OF THE INVENTION

Many types of weatherstrip material exist, and a great variety of different types of weatherstrip materials have been provided in the past. Also, the patent literature is replete with different types of weatherstrips among which may be mentioned the Schlagel et al U.S. Pat. No. 2,228,368; Spraragen U.S. Pat. No. 2,232,570; Balfe U.S. Pat. No. 2,336,835; Merrill U.S. Pat. No. 2,475,332 and Olson U.S. Pat. No. 4,064,654. Of these, the Olson U.S. Pat. No. '654 is of the general type especially constructed for slidable closures, retained in a confining channel in one element with a contact surface projecting therefrom for sliding engagement with a second element.

The Gerald Kessler U.S. Pat. Nos. 3,535,824 and 3,685,206 disclose low friction abrasion resistant plastic weatherstrips of the same general type. More recently, all-plastic weatherstrips have appeared on the market having a rigid base and a flexible generally cylindrical sealing portion projecting therefrom, in some cases the upper surface of the sealing portion being coated with a low friction material. The upwardly projecting sealing portion is generally configured as a circular cylinder and may be either hollow or filled, such as with sponge material. While the circular cylindrical configuration provides a good sealing function and the low friction coating when present provides the advantages of the aforementioned Kessler patents, these new constructions suffer from a serious disadvantage.

Thus, even those new constructions which are provided with a low friction coating have a tendency to crease, "gather" or bunch-up when a mating surface is moved longitudinally thereagainst, e.g. when a weatherstripping material of this type is used in a horizontal slider window or a patio door or the like. As a result, the sealing efficiency of the weatherstrip material becomes reduced and, moreover, friction increases and it becomes increasingly difficult to slide open the window or door.

SUMMARY OF THE INVENTION

It is therefore an object of the present invention to overcome deficiencies in the prior art, such as indicated above.

It is another object to provide for improved weather sealing between elements which slide relative to one another.

It is a further object of the invention to provide an improved weatherstrip material particularly adapted for use in a sliding environment.

It is still another object of the present invention to provide a weatherstrip material which has a rigid, relatively low friction contact surface which will slide easily and will not bunch-up or crinkle or crease or gather when it is moved longitudinally such as in a horizontal slider window or a patio door.

These and other objects and the nature and advantages of the instant invention will be more apparent from the following detailed description of certain illustrated embodiments taken in conjunction with the drawing below. In general, however, the improved weatherstrip of the present invention is provided with a contact surface which is rigid and which is supported therebeneath by elastic supports. The contact surface can be of any desired configuration such as rounded, smooth, ribbed or even a fin, the main point being that it is rigid and will slide and will not bunch-up when it is moved longitudinally such as in a horizontal slider window or patio door.

BRIEF DESCRIPTION OF DRAWING

FIGS. 1–9 are cross-sectional views of different embodiments of an extruded all-plastic weatherstrip according to the invention; and FIG. 10 is a cross-sectional view of another embodiment in a typical use environment.

DETAILED DESCRIPTION OF EMBODIMENTS

FIG. 1 shows a first weatherstrip 10 having a bottom retainer section comprising a longitudinally extending base portion 12 and a longitudinally extending support portion 14 projecting upwardly from the base portion 12 and integral and unitary therewith. The base portion 12 and support portion 14 are both sufficiently rigid and strong so as to be capable of retaining their shape and position when the weatherstrip is subjected to pressure from the surface to be sealed. It will be understood that the retainer can be of any shape, and its configuration is designed for its intended environment of use. While it must be sufficiently strong and rigid to retain its shape and position as indicated above when captured in a supporting structure, considerable flexibility may be possible depending on the circumstances.

Projecting upwardly from the support portion 14 and integral therewith is an elastic portion 16 which may be formed of an elastomer or a resilient plastic. It is the elastic portion 16 which provides the weatherstrip 10 with its ability to resiliently contact a surface against which the weatherstrip 10 will slide, thereby effecting its sealing function, and yet be capable of accommodating different sizes of gaps between the sliding members due to inevitable manufacturing tolerances. While the elastic portion 16 may be not unitary with the retainer 12, 14, it is integrally connected therewith.

Supported by the elastic portion 16 is a self-supporting, longitudinally extending contact strip 18 which directly contacts the surface to be sealed. The contact strip 18 extends transversely and defines the width of the weatherstrip 10. It is important according to the invention that the contact strip 18 be sufficiently rigid to substantially retain its shape and position when the weatherstrip 10 is subjected to pressure from the surface to be sealed, i.e. the contact strip must be sufficiently rigid so as not to gather, crease or wrinkle bunch-up when it is moved longitudinally relative to the surface to be sealed. Desirably, the contact strip 18 is formed of a low friction plastic such as polyethylene or polypropylene. Since the contact strip 18 is rigid while the elastic portion 16 is more flexible, these elements will normally not be unitary, i.e. not made of the same material, although they are integrally connected.

While in FIG. 1 the contact strip 18 of the weatherstrip 10 is shown as being generally planar, it can take a variety of configurations such as rounded, smooth or ribbed. Thus, in FIG. 2 there is shown a variation 20 wherein the contact strip 28 is rounded. In the weatherstrip 20 it will also be seen that the support portion 24 is of a somewhat different configuration than the support portion 14 of the weatherstrip 10. Also, the elastic portion 16 consists of two longitudinally extending webs 26 inclined inwardly from the bottom to the top thereof.

The embodiment 30 of FIG. 3 is very similar to that of FIG. 2, except that the contact strip 38 is generally planar having rounded corners.

The weatherstrip 40 of FIG. 4 is similar to the weatherstrip 30 of FIG. 3, except that the contact strip 48 is provided with longitudinally extending ribs on the supper surface thereof.

The weatherstrip 50 of FIG. 5 is similar to the weatherstrip 10 of FIG. 1 except that the elastic portion comprises two longitudinally extending webs 56.

The embodiment 60 of FIG. 6 is similar to the weatherstrip 30 of FIG. 3, except that one elastic web 66 is taller than the other elastic web 66', and as a result the contact strip 68 is slanted or inclined transversely.

The weatherstrip 70 of FIG. 7 is similar to that of FIG. 5, except that the support portion 74 is solid. The construction 80 of FIG. 8 combines features of FIGS. 3 and 5.

The weatherstrip 90 of FIG. 9 is similar to the weatherstrip 40 of FIG. 4, except that a different retainer configuration is provided, both the base portion 92 and the support portion 94 being somewhat different than the other illustrated embodiments.

The weatherstrip 100 of FIG. 10 is similar to that of FIG. 3, except that the elastic portion comprises three longitudinally extending webs 116. FIG. 10 shows the weatherstrip 100 in a typical use situation, where it is inserted into a suitable slot in the edge of a window or door frame 120, so that the rigid contact strip 118 extends towards and in contact with the opposite edge of a door or window 122.

Because the elastic portion underlying the contact strip must in general have somewhat different properties than the contact strip in the weatherstrip according to the present invention, these portions are normally made of different materials. For example, the contact strip 18, 28, ... 118 is desirably formed of polyethylene, e.g. high density polyethylene or low density polyethylene, polypropylene or rigid vinyl plastic, and the retainer including the base and support portions may be formed of the same material. The elastic portion 16, 26 ... 116 is desirably formed of a elastomer such as thermoplastic rubber (TPR), ethylene/vinyl acetate copolymer (EVA) or flexible vinyl.

Weatherstrip material according to the invention may be easily and simply formed by co-extrusion, a known technique. So that the various portions will be integral, the different materials used must be somewhat compatible. Therefore, it is preferred that the elastic portion be formed of TPR when the contact strip is formed of polypropylene, that the elastic portion be formed of EVA when the contact strip is formed of polyethylene, and that the elastic portion be formed of flexible vinyl when the contact strip is formed of rigid vinyl.

It will be obvious to those skilled in the art that various other changes and modifications may be made without departing from the scope of the invention and the invention is not to be considered limited to what is shown in the drawings and described in the specification.

What is claimed is:

1. An extruded all-polymer weatherstrip having a longitudinally extending base portion of sufficient mechanical strength to support the weatherstrip in a slot below a surface to be sealed;
   a longitudinally extending support portion projecting upwardly from said base portion and integral and unitary therewith, said support portion being sufficiently rigid to substantially retain its shape and position when said weatherstrip is subjected to pressure from the surface to be sealed;
   a longitudinally and transversely extending elastic portion projecting upwardly from said support portion and integral therewith, said elastic portion being formed of an elastomer or resilient plastic; and
   a self-supporting, longitudinally extending generally planar contact strip of thickness on the order of about 25-30 mils for directly contacting the surface to be sealed, said contact strip being supported by and integral with the said elastic portion, said contact strip extending transversely and defining the width of said weatherstrip and being sufficiently rigid to substantially retain its shape and position when said weatherstrip is subjected to pressure from the surface to be sealed.

2. An extruded all-polymer weatherstrip according to claim 1, wherein said base portion is in the form of an elongated strip.

3. A weatherstrip according to claim 1 formed by co-extrusion.

4. A weatherstrip according to claim 1 wherein said base portion, said support portion and said contact strip are formed of the same material.

5. A weatherstrip according to claim 1 wherein said contact strip is provided with a plurality of longitudinally extending ribs projecting upwardly therefrom.

6. A weatherstrip according to claim 1 wherein said contact strip is formed of polypropylene and said elastic portion is formed of thermoplastic rubber.

7. A weatherstrip according to claim 1 wherein said contact strip is formed of polyethylene and said elastic portion is formed of ethylene-vinyl acetate copolymer.

8. An extruded all-polymer weatherstrip having a longitudinally extending base portion of sufficient mechanical strength to support the weatherstrip in a slot below a surface to be sealed;
   a longitudinally and laterally extending elastic portion projecting upwardly from said base portion, said elastic portion being formed of an elastomer or resilient plastic; and
   a self-supporting, longitudinally extending contact strip of thickness on the order of about 25-30 mils for directly contacting the surface to be sealed, said contact strip being supported by and integral with said elastic portion, said contact strip extending transversely and defining the width of said weatherstrip and being sufficiently rigid to substantially retain its shape and position when said weatherstrip is subjected to pressure from the surface to be sealed.

9. An extruded all-polymer weatherstrip according to claim 8, wherein said base portion is in the form of an elongated strip.

10. A weatherstrip according to claim 8, formed by co-extrusion.

11. A weatherstrip according to claim 8, wherein said base portion and said contact strip are formed of the same material.

12. A weatherstrip according to claim 8 wherein said contact strip is provided with a plurality of longitudinally extending ribs projecting upwardly therefrom.

13. A weatherstrip according to claim 8 wherein said contact strip is formed of polypropylene and said elastic portion is formed of thermoplastic rubber.

14. A weatherstrip according to claim 8 wherein said contact strip is formed of polyethylene and said elastic portion is formed of ethylene-vinyl acetate copolymer.

15. An extruded all-polymer weatherstrip having a longitudinally extending base portion of sufficient mechanical strength to support the weatherstrip in a slot below a surface to be sealed;

a longitudinally and laterally extending elastic portion projecting upwardly from said base portion, said elastic portion being formed of an elastomer or resilient plastic; and a self-supporting, longitudinally extending contact strip of thickness on the order of about 25-30 mils and having a plurality of longitudinally extending ribs projecting upwardly therefrom, said contact strip being adapted to directly contact the surface to be sealed, said contact strip being supported by and integral with said elastic portion, said contact strip extending laterally and defining the width of said weatherstrip and overlaying said elastic portion across said width, said contact strip being sufficiently rigid to substantially retain its shape and position when said weatherstrip is subjected to pressure from the surface to be sealed.

* * * * *